Patented Sept. 13, 1949

2,481,826

UNITED STATES PATENT OFFICE 2,481,826

PROCESS FOR MAKING ALIPHATIC NITRILES

John N. Cosby, Morristown, N. J., assignor to Allied Chemical & Dye Corporation, New York, N. Y., a corporation of New York No Drawing. Application February 28, 1947, Serial No. 731,726

13 Claims. (Cl. 260—465.3)

This invention relates to the manufacture of nitriles and is particularly concerned with the production of aliphatic nitriles by reaction of ammonia with organic compounds.

In the past it has been proposed to react olefins with ammonia in the presence of nickel or cobalt catalysts at elevated temperatures and pressures. This method, however, appears to yield only small proportions of organic nitrogen compounds. Thus, in United States Patent 2,398,899 the weight percentages of total nitrogen compounds produced according to the examples presented are only 10% to 17%. If these yields are expressed in terms of theoretical yields, still lower values are obtained.

It is an object of the present invention to produce aliphatic nitriles by reaction of organic compounds with ammonia. It is a further object of the invention to provide a process which gives higher yields of nitriles than hitherto obtainable by this type of reaction. A still further object of the invention is to effect the desired conversion without the necessity for employing high pressures and high pressure equipment. A yet further object of the invention is the production of acrylonitrile from readily obtainable hydrocarbons. A further object is the production of acetonitrile from readily obtainable hydrocarbons. Further objects of the invention will be apparent from the following description and detailed examples.

In accordance with the present invention an olefin is reacted with ammonia in the presence of elemental oxygen. It has been found that the oxygen promotes nitrile formation, possibly by the formation of an oxygen-containing intermediate, so that relatively high yields of the nitrile are obtained. The process is capable of being conducted under a wide variety of reaction conditions. It has been found to proceed effectively in the presence or absence of catalysts at ordinary low pressures, i. e. ½ to 5 atmospheres absolute, and with widely varying proportions of reactants.

In general it is desirable to pass, at ordinary low pressure, a mixture of the olefin in vapor phase with from 1 to 10 times its molecular proportion of ammonia and from 2 to 40 times its molecular proportion of oxygen, which may be used conveniently in the form of air or other oxygen-containing gas supplying 10 to 200 mols of inert diluent, through a reaction zone maintained at 400° to 600° C. Good yields may be obtained using a space velocity such as to provide 50% to 100% attack of the olefin. Space velocities between 1,000 and 20,000 volumes of gas, (measured at 0° C. and 760 mm. of mercury pressure), per volume of reaction space or catalysts mass per hour have been employed without indication that the effective velocities are limited to this range. The concentration of oxygen in the reaction mixture may be reduced substantially below the concentration in air without sharply altering the course of the reaction. Thus reaction mixtures initially containing as little as 3% of oxygen have been employed satisfactorily.

The process of the invention is especially suitable for the manufacture of lower aliphatic nitriles, such as acrylonitrile, methacrylonitrile, and acetonitrile, from short-chain olefins, for example, propene, butene-1, butene-2, isobutene, butadiene, 2-methylbutene-1, 3-methyl-butene-1, 2-methyl-butene-2, pentene-1, pentene-2, isoheptene mixtures, and the like.

The yields of the various nitriles depend in considerable measure upon the reaction conditions employed. Thus high proportions of oxygen favor the production of short-chain nitriles as the result of the tendency of the oxygen to burn off carbon from the olefin and thus shorten the chain whereas low concentrations of oxygen, because of their lesser tendency to produce this effect, favor the production of longer chain nitriles.

In conducting the process of the invention it is preferred to pass a mixture of an olefin containing a 3-carbon straight chain (as the longest chain) mixed with about 3 to 5 molar proportions of ammonia, 2 to 30 molar proportions of oxygen, and 40 to 120 molar proportions of an inert diluent, such as nitrogen, through a contact mass comprising a vanadium oxidation catalyst at a temperature between 450° and 520° C. and at approximately atmospheric pressure. Under these conditions especially good yields of acetonitrile are obtainable from propene and of both acrylonitrile and acetonitrile from 2-methylpropene.

Whether or not oxidation catalysts are employed, the reaction proceeds with the formation of nitriles and accordingly the invention is not limited to the use of oxidation catalysts. However, the presence of an oxidation catalyst improves the reaction, increases the yields of desired nitriles, and accelerates the nitrile formation.

It is considered that catalysts commonly employed in the partial oxidation of organic compounds, such as the oxidation of benzene or naphthalene to maleic or phthalic anhydride, may be used advantageously in the present process.

Since in the conversion of olefins to nitriles, the nature of the catalyst is less important than in partial oxidation processes, the process of the invention may be carried out quite satisfactorily with catalysts which, in the partial oxidation processes, give relatively poor yields.

Among the numerous catalysts which may be employed in carrying out the process may be mentioned thorium, molybdenum, vanadium, tin, chromium, tungsten, cobalt, iron, manganese or copper, employed as the metals or the metal oxides, the oxides of aluminum, uranium, etc., vanadates, vanadic acid and mixtures of these various catalysts with each other and with other materials. Vanadium oxide catalysts, and especially those containing molybdenum oxide, which are notably active for the partial oxidation of benzene and naphthalene, are especially desirable as catalysts for carrying out the process of this invention. The preparation and composition of preferred catalysts are disclosed, for example, in United States Patent 2,081,272 and 2,180,353 of Harold B. Foster, and United States Patent 2,294,130 of Frank Porter.

The following examples further illustrate the invention. In the examples quantities are expressed in terms of weight unless otherwise indicated.

Example 1

A mixture of one mol of 2-methyl-propene, 2 mols of ammonia and 150 mols of air was passed through a reaction zone containing a vanadium oxidation catalyst maintained at a temperature of 440° to 480° C. The space velocity of the mixture was maintained at approximately 5400 volumes of mixture (s. t. p.) per volume of reaction zone (i. e. catalyst bed volume at reaction temperature) per hour. The vaporous reaction products were cooled to recover condensable constituents and the nitrile content of the condensate was determined. The product yield, based on 2-methylpropene consumed, was 28 mol percent acrylonitrile, 19 mol percent acetonitrile, and 10 mol percent hydrogen cyanide.

The catalyst employed in this example was prepared by the procedure described for making catalyst A (maleic anhydride catalyst) on page 2 of United States Patent 2,294,130 of Frank Porter. In making the catalyst, the active catalytic material was deposited on 8–10 mesh "Alundum" as carrier. The final catalyst contained vanadium, molybdenum, and phosphorus corresponding to 11.4% $V_2O_5$, 3.9% $MoO_3$, and 0.034% $P_2O_5$.

Example 2

A mixture of 2-methyl-propene, ammonia and air in the proportions of one mol of 2-methyl-propene, 3 mols of ammonia, and 110 mols of air was passed through the catalyst mass described in Example 1 maintained at a temperature of 485° C., at an hourly space velocity of 3000.

The yields were 28 mol percent acrylonitrile, 26 mol percent acetonitrile, and 6 mol percent HCN based on methyl-propene introduced.

Example 3

A mixture of 2-methyl-propene, ammonia, oxygen and nitrogen in the proportions of one mol of 2-methyl-propene, 2.3 mols of ammonia, 2.4 mols of oxygen and about 80 mols of nitrogen, was passed through the catalyst mass described in Example 1 maintained at 510° C., at an hourly space velocity of 2200. The following yields, based on methyl-propene consumed, were obtained: acrylonitrile—30 mol percent, acetonitrile—12 mol percent, hydrogen cyanide—6 mol percent. About 15% of the 2-methyl-propene passed through without reaction.

Example 4

A mixture of 2-methyl-propene, ammonia and air in the molar ratio 1:2:100 was passed through the catalyst mass previously described at an hourly space velocity of 1800 while the temperature was maintained at 550° C. The yields, based on 2-methyl-propene consumed, were: acrylonitrile—20 mol percent, acetonitrile—12 mol percent, HCN—6 mol percent. About 27 percent of the methyl-propene was unattached.

Example 5

The mixture described in Example 4 was passed at an hourly space velocity of 3000 through a reaction zone free of catalyst maintained at 500° C. The yields based on methyl-propene introduced were: acrylonitrile—10 mol percent, acetonitrile—7 mol percent.

Example 6

A mixture of propene, ammonia and air in a mol ratio of 1:2:125 was passed at an hourly space velocity of 3600 through the catalyst mass described in Example 1 maintained at 480° C. The yields of products based on propene introduced were: acrylonitrile—6 mol percent, acetonitrile—10 mol percent and HCN—10 mol percent.

Example 7

A mixture of propene, ammonia, and air in molecular proportions of 1:2:150 was passed through the catalyst mass described in Example 1 at an hourly space velocity of 4200 while the mass was maintained at 450° C. The yields of products, based on propene consumed, were: acetonitrile—25 mol percent, HCN—15 mol percent. About 32% of the propene was unattacked.

Example 8

A mixture of butadiene, ammonia, and air in molecular ratio of 1:2:100 was passed at an hourly space velocity of 2000 through the catalyst mass described in Example 1 maintained at 425° to 475° C. Yields of 10 mol percent acrylonitrile and 10 mol percent acetonitrile, based on butadiene introduced, were obtained.

Results similar to those described in the preceding examples, though somewhat smaller yields of nitriles, are obtained substituting butene-1, butene-2, the amylenes, and higher olefins, such as isoheptene mixtures, for the olefins employed in the examples.

I claim:
1. The method of making an aliphatic nitrile, which comprises reacting an olefin with a mixture containing oxygen and about 1 to 10 mols of ammonia per mol of olefin, at a temperature between 400° C. and 600° C.
2. The method of making an aliphatic nitrile, which comprises passing a gaseous mixture comprising about 1 mol of olefin, 1 to 10 mols of ammonia, and oxygen into contact with an oxidation catalyst at a temperature between 400° C. and 600° C.
3. The method of making an aliphatic nitrile, which comprises reacting an olefin with a mixture containing about 1 to 10 mols of ammonia and about 2 to 40 mols of oxygen per mol of olefin at a temperature between 400° C. and 600° C.
4. The method of making an aliphatic nitrile, which comprises passing a gaseous mixture com- prising about 1 mol of olefin, 1 to 10 mols of ammonia, and 2 to 40 mols of oxygen into contact with an oxidation catalyst at a temperature between 400° C. and 600° C.

5. The method of making an aliphatic nitrile, which comprises passing a gaseous mixture comprising about one mol of olefin, 1 to 10 mols of ammonia, 2 to 40 mols of oxygen, and 10 to 200 mols of inert diluent through a contact mass comprising a vanadium oxidation catalyst at a temperature between 400° C. and 600° C.

6. The method of making an aliphatic nitrile, which comprises reacting an olefin containing a 3-carbon straight chain as its longest chain with a gaseous mixture containing about 1 to 10 mols of ammonia and about 2 to 40 mols of oxygen per mol of olefin, at a temperature between 400° C. and 600° C.

7. The method of making an aliphatic nitrile, which comprises passing a gaseous mixture comprising an olefin containing a 3-carbon straight chain as its longest chain, about 1 to 10 mols of ammonia, and about 2 to 40 mols of oxygen per mol of olefin into contact with an oxidation catalyst at a temperature between 400° C. and 600° C.

8. The method of making an aliphatic nitrile, which comprises passing at ordinary low pressures a gaseous mixture comprising about one mol of olefin containing a 3-carbon straight chain as its longest chain, 1 to 10 mols of ammonia, 2 to 40 mols of oxygen, and 10 to 200 mols of inert diluent through a contact mass comprising a vanadium oxidation catalyst at a temperature between 400° C. and 600° C.

9. The method of making an aliphatic nitrile, which comprises reacting 2-methyl-propene with a mixture containing about 1 to 10 mols of ammonia and about 2 to 40 mols of oxygen per mol of olefin, at a temperature between 400° C. and 600° C.

10. The method of making an aliphatic nitrile, which comprises passing a gaseous mixture comprising 2-methyl-propene, about 1 to 10 mols of ammonia, and about 2 to 40 mols of oxygen per mol of olefin into contact with an oxidation catalyst at a temperature between 400° C. and 600° C.

11. The method of making an aliphatic nitrile, which comprises passing at ordinary low pressure a gaseous mixture comprising about one mol of 2-methyl-propene, 1 to 10 mols of ammonia, 2 to 40 mols of oxygen, and 10 to 200 mols of inert diluent through a contact mass comprising a vanadium oxidation catalyst at a temperature between 400° C. and 600° C.

12. The method of making an aliphatic nitrile, which comprises passing at ordinary low pressure a gaseous mixture essentially composed of about one mol of an olefin containing a 3-carbon straight chain as its longest chain, 3 to 5 mols of ammonia, 2 to 30 mols of oxygen, and 40 to 120 mols of nitrogen through a contact mass comprising a vanadium oxidation catalyst at a temperature between 450° C. and 520° C. at a rate sufficient to provide 50% to 100% attack of the olefin.

13. The method of making an aliphatic nitrile, which comprises passing at ordinary low pressure a gaseous mixture essentially composed of about one mol of 2-methyl-propene, 3 to 5 mols of ammonia, 2 to 30 mols of oxygen, and 40 to 120 mols of nitrogen through a contact mass comprising a vanadium oxidation catalyst at a temperature between 450° C. and 520° C. at a rate sufficient to provide 50% to 100% attack of the 2-methyl-propene.

JOHN N. COSBY.

REFERENCES CITED

The following references are of record in the file of this patent:

UNITED STATES PATENTS

| Number | Name | Date |
| --- | --- | --- |
| 1,934,838 | Andrussow | Nov. 14, 1933 |
| 2,083,824 | Bond et al. | June 15, 1937 |
| 2,299,755 | Jolly | Oct. 27, 1942 |
| 2,381,709 | Apgar et al. | Aug. 7, 1945 |
| 2,385,552 | Spence et al. | Sept. 25, 1945 |
| 2,432,532 | Mahan | Dec. 16, 1947 |